United States Patent
Maute

(10) Patent No.: US 7,866,207 B2
(45) Date of Patent: *Jan. 11, 2011

(54) APPARATUS AND METHOD FOR FLUID FLOW MEASUREMENT WITH SENSOR SHIELDING

(75) Inventor: Robert E. Maute, Richardson, TX (US)

(73) Assignee: REM Scientific Enterprises, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/497,934

(22) Filed: Jul. 6, 2009

(65) Prior Publication Data

US 2009/0266155 A1    Oct. 29, 2009

Related U.S. Application Data

(63) Continuation of application No. 10/574,330, filed as application No. PCT/US2004/032129 on Sep. 30, 2004, now Pat. No. 7,574,907.

(60) Provisional application No. 60/507,720, filed on Oct. 1, 2003.

(51) Int. Cl.
  *E21B 47/10* (2006.01)
  *G01F 1/58* (2006.01)

(52) U.S. Cl. .................. 73/152.29; 73/861.12

(58) Field of Classification Search ............ 73/152.29, 73/861.11, 861.12, 861.15–861.17
  See application file for complete search history.

(56) References Cited

U.S. PATENT DOCUMENTS

| | | | |
|---|---|---|---|
| 2,842,961 A | 7/1958 | Doll | |
| 3,076,334 A | 2/1963 | Wiley | |
| 3,288,210 A | 11/1966 | Bryant | |
| 3,530,713 A | 9/1970 | Nazareth, Jr. | |
| RE28,989 E | 10/1976 | Cushing | |
| 3,999,443 A | 12/1976 | Appel et al. | |
| 4,170,133 A | 10/1979 | Gardner | |

(Continued)

FOREIGN PATENT DOCUMENTS

GB    811 347 A    4/1959

(Continued)

OTHER PUBLICATIONS

Maute, R.E., "A Guide to Diagnosing Your Wells: Production Logging," Probe Technology Services, Inc., 2000.

(Continued)

*Primary Examiner*—John Fitzgerald
(74) *Attorney, Agent, or Firm*—Slater & Matsil, L.L.P.

(57) ABSTRACT

Methods and apparatuses for detecting radial flows of conductive fluid are provided. In an embodiment of the present invention, shields are used to prevent or reduce circulating electrical currents from causing a voltage difference that would adversely affect the measured voltage difference between two adjacent electrodes. The shields may be a conduit through which conductive fluid may flow. Groups of sensors, e.g., two or more, may be placed within the shield. The shields may have any cross-section shape. Generally, once the circulating electrical current flow between the electrode pairs is substantially reduced or eliminated, only the voltage difference from the localized induced electric field remains. This way, a true induced voltage may be measured, and thus an accurate value for the fluid velocity may be determined.

36 Claims, 5 Drawing Sheets

U.S. PATENT DOCUMENTS

| | | | |
|---|---|---|---|
| 4,228,350 | A | 10/1980 | Paap et al. |
| 4,513,624 | A | 4/1985 | McHale et al. |
| 4,631,969 | A | 12/1986 | Schmoock |
| 4,704,907 | A | 11/1987 | Mannherz et al. |
| 4,920,795 | A | 5/1990 | Codazzi et al. |
| 4,938,073 | A | 7/1990 | Stephenson |
| 4,953,408 | A | 9/1990 | Appel et al. |
| 4,969,363 | A | 11/1990 | Mochizuki |
| 5,251,479 | A | 10/1993 | Siegfried, II et al. |
| 5,297,425 | A | 3/1994 | Hamby et al. |
| 5,388,455 | A | 2/1995 | Hamby et al. |
| 5,448,920 | A | 9/1995 | Ketelsen et al. |
| 5,551,287 | A | 9/1996 | Maute et al. |
| 6,173,793 | B1 | 1/2001 | Thompson et al. |
| 6,223,823 | B1 | 5/2001 | Head |
| 6,237,424 | B1 | 5/2001 | Salmasi et al. |
| 6,431,011 | B1 | 8/2002 | Feller |
| 6,453,754 | B1 | 9/2002 | Florin |
| 6,711,947 | B2 | 3/2004 | Maute |
| 6,779,407 | B2 | 8/2004 | Maute |
| 6,971,271 | B2 | 12/2005 | Maute |
| 7,509,852 | B2 | 3/2009 | Maute |
| 7,574,907 | B2 * | 8/2009 | Maute ................... 73/152.29 |

FOREIGN PATENT DOCUMENTS

| | | |
|---|---|---|
| GB | 2 056 691 A | 3/1981 |
| GB | 2 064 130 A | 6/1981 |
| GB | 2 253 907 A | 9/1992 |
| GB | 2 405 214 A | 2/2005 |
| JP | 58-17318 | 2/1983 |
| WO | WO 01/11190 A1 | 2/2001 |

OTHER PUBLICATIONS

Hill, A.D., et al., "Production Logging Tool Behavior in Two-Phase Inclined Flow," 56$^{th}$ Annual Fall Technical Conference and Exhibition of the Society of Petroleum Engineers of AIME, San Antonio, TX, Oct. 5-7, 1981.

Branagan, P., et al., "Tests Show Production Logging Problems in Horizontal Gas Wells," Oil & Gas Journal, Jan. 10, 1994, pp. 41-45.

Kelman, J.S., "Biphasic Fluid Studies for Production Logging in Large-Diameter Deviated Walls [sic]," The Log Analyst, Nov.-Dec. 1993, pp. 6-10.

Ding, Z.X., et al., "A Comparison of Predictive Oil/Water Holdup Models for Production Log Interpretation in Vertical and Deviated Wellbores," SPWLA 35$^{th}$ Annual Logging Symposium, Jun. 9-22, 1994, pp. 1-18.

Nice, S.B., "Production Logging in Horizontal Wellbores," 5$^{th}$ World Oil et al. Horizontal Well Technology Int. Conference (Houston) Proc., sect 11, Nov. 1993.

Zhu, D., et al., "The Effect of Flow from Perforations on Two-Phase Flow: Implications for Production Logging," 63$^{rd}$ Annual Technical Conference and Exhibition of the Society of Petroleum Engineers, Houston, TX, Oct. 2-5, 1988, pp. 267-275.

Molz, F.J., et al, "Development and Application of Borehole Flowmeters for Enviromental Assessment," The Log Analyst, Jan.-Feb. 1993, pp. 13-23.

Ross, G., "The Electromagnetic Flowmeter as Applied to the Measurement of Blood Flow in Living Systems," Symposium on Flow: Its Measurement and Control in Science and Industry, vol. 1, Pittsburgh, PA, 1971, pp. 1337-1345.

Cushing, V.J., "Electromagnetic Water Current Meter," Water Resources Instrumentation, vol. 1 Measuring and Sensing Methods, Proceedings of the International Seminar and Exposition on Water Resources Instrumentation, Jun. 4-6, 1974, Chicago, IL, pp. 35-55.

Razi, M., et al., "Characterizing Flow through a Perforation Using Ultrasonic Doppler," Production Operations Symposium, Oklahoma City, OK, Apr. 2-4, 1995, pp. 943-953.

Baker, R.C., "A Review of Some Applications of Electromagnetic Flow Measurement," Symposium on Flow: Its Measurement and Control in Science and Industry, vol. 1, Part 2, Flow Measuring Devices, 1971, pp. 745-753.

Flood, J. "Single-Sensor Measurement of Flow in Filled or Partially Filled Process Pipes," Sensors Magazine, Sep. 1997.

Doney, B., "EMF Flow Measurement in Partially Filled Pipes," Sensors, Oct. 1999, pp. 65-68.

Maute, B., "Practical Interpretation of Production Logs," Version 9.0, Customized for the China National Oil and Gas Exploration & Development Corporation, Earth Resource and Environment Center, The University of Texas at Arlington, Dec. 17-19, 1997, pp. 1-160.

Kliman, G.B., "Calibration of an Electromagnetic Velocity Probe for Electrically Conducting Liquids," The Review of Scientific Instruments, No. 6, vol. 33, Jun. 1962, pp. 684-685.

Kolin, A., "Electromagnetic Velometry. I. A Method for the Determination of Fluid Velocity Distribution in Space and Time," Journal of Applied Physics, vol. 15, Feb. 1944, pp. 150-164.

Kolin, A., et al., "Electromagnetic Velometry. II. Elimination of the Effects of Induced Currents in Explorations of the Velocity Distribution in Axially Symmetrical Flow," Journal of Applied Physics, vol. 25, No. 4, Apr. 1954, pp. 409-413.

* cited by examiner

APPARATUS AND METHOD FOR FLUID FLOW MEASUREMENT WITH SENSOR SHIELDING

This application is a continuation of U.S. patent application Ser. No. 10/574,330, filed on Mar. 31, 2006, now issued as U.S. Pat. No. 7,574,907, which application is a national filing under 35 U.S.C. §371 of International Application No. PCT/US2004/032129, filed on Sep. 30, 2004, which application claims the benefit of U.S. Provisional Application No. 60/507,720, filed on Oct. 1, 2003, entitled "Apparatus and Method for Fluid Flow Measurement with Sensor Shielding," all of which applications are hereby incorporated herein by reference.

CROSS-REFERENCE TO RELATED APPLICATIONS

This application is related to the following co-pending and commonly-assigned patent applications: application Ser. No. 12/412,246, filed on Mar. 26, 2009, entitled "Fluid Flow Measuring Device and Method of Manufacturing Thereof;" and application Ser. No. 12/513,807, filed on May 6, 2009, entitled "Rotating Fluid Flow Measurement Device and Method," both of which applications are hereby incorporated herein by reference.

TECHNICAL FIELD

This invention relates generally to fluid flow sensing devices and methods and, more particularly, to fluid flow sensing devices and methods utilizing sensor shielding.

BACKGROUND

An oil and gas well is shown in FIG. 1 generally at 60. Well construction involves drilling a hole or borehole 62 in the surface 64 of land or ocean floor. The borehole 62 may be several thousand feet deep, and drilling is continued until the desired depth is reached. Fluids such as oil, gas and water reside in porous rock formations 68. A casing 72 is normally lowered into the borehole 62. The region between the casing 72 and rock formation 68 is filled with cement 70 to provide a hydraulic seal. Usually, tubing 74 is inserted into the hole 62, the tubing 74 including a packer 76 which comprises a seal. A packer fluid 78 is disposed between the casing 72 and tubing 74 annular region. Perforations 80 may be located in the casing 72 and cement 70, into the rock 68, as shown.

Production logging involves obtaining logging information about an active oil, gas or water-injection well while the well is flowing. A logging tool instrument package comprising sensors is lowered into a well, the well is flowed and measurements are taken. Production logging is generally considered the best method of determining actual downhole flow. A well log, a collection of data from measurements made in a well, is generated and is usually presented in a long strip chart paper format that may be in a format specified by the American Petroleum Institute (API), for example.

The general objective of production logging is to provide information for the diagnosis of a well. A wide variety of information is obtainable by production logging, including determining water entry location, flow profile, off depth perforations, gas influx locations, oil influx locations, non-performing perforations, thief zone stealing production, casing leaks, crossflow, flow behind casing, verification of new well flow integrity, and floodwater breakthrough, as examples. The benefits of production logging include increased hydrocarbon production, decreased water production, detection of mechanical problems and well damage, identification of unproductive intervals for remedial action, testing reservoir models, evaluation of drilling or completion effectiveness, monitoring Enhanced Oil Recovery (EOR) process, and increased profits, for example. An expert generally performs interpretation of the logging results.

In current practice, measurements are typically made in the central portion of the wellbore cross-section, such as of spinner rotation rate, fluid density and dielectric constant of the fluid mixture. These data may be interpreted in an attempt to determine the flow rate at any point along the borehole. Influx or exit rate over any interval is then determined by subtracting the flow rates at the two ends of the interval.

In most producing oil and gas wells, the wellbore itself generally contains a large volume percentage or fraction of water, but often little of this water flows to the surface. The water that does flow to the surface enters the wellbore, which usually already contains a large amount of water. The presence of water already in the wellbore, however, makes detection of the additional water entering the wellbore difficult and often beyond the ability of conventional production logging tools.

Furthermore, in deviated and horizontal wells with multiphase flow, and also in some vertical wells, conventional production logging methods are frequently misleading due to complex and varying flow regimes or patterns that cause misleading and non-representative readings. Generally, prior art production logging is performed in these complex flow regimes in the central area of the borehole and yields frequently misleading results, or may possess other severe limitations. Often the location of an influx of water, which is usually the information desired from production logging, is not discernable due to the small change in current measurement responses superimposed upon large variations caused by the multiphase flow conditions.

U.S. patent application Ser. No. 09/880,402, filed Jun. 13, 2001, entitled "Conductive Fluid Logging Sensor and Method," now issued as U.S. Pat. No. 6,711,947 B2, Ser. No. 10/600,053, filed Jun. 20, 2003, entitled "Conductive Fluid Logging Sensor and Method," now issued as U.S. Pat. No. 6,799,407 B2, and Ser. No. 10/924,320, filed Aug. 23, 2004, entitled "Fluid Flow Measuring Device and Method of Manufacturing Thereof," now issued as U.S. Pat. No. 6,971,271, disclose apparatuses and methods for measuring the flow of fluid as it enters or exits an interior wall of a fluid conduit before the fluid becomes substantially intermixed with the fluids and the often complex flow pattern already in the fluid conduit. In particular, the apparatuses and methods may be used to measure the radial flow of conductive fluid through the wall of a fluid conduit, generally without being sensitive to non-conductive fluid flow or to non-radial conductive fluid flow. As an application example, embodiments may be used to detect and measure the radial flow of water through the conduit or borehole wall of an oil or gas well.

As described in the above-referenced patent applications, an electric field is induced when water or generally any material moves through a magnetic field. When the material has at least a small amount of conductivity, the voltage difference generated by the induced electric field between two points may be measured. Generally, the voltage from the induced electric field is proportional to the velocity of the fluid medium. If this voltage is measured, the velocity of the medium may be determined.

In some cases, however, another effect may also contribute to the measured voltage. In particular, a voltage drop due to the circulation of electrical currents in the fluid may introduce an extra voltage component into the measured voltage. These circulating electrical currents generally may be caused by the ubiquitous induced electric fields in the vicinity of the two electrodes, and may depend upon the velocity distribution of the fluid, as well as the values and locations of all the induced electric fields in the proximity of the measure electrodes.

Generally, the voltage difference in a localized area (such as between two closely spaced electrodes) contributed by these circulating currents is dependent upon the conductivity of the medium and the localized current density. In addition, the value of the circulating current may change from point to point. Thus, under some circumstances or in some applications, the measured voltage difference between two electrodes may introduce an error component and interfere with a reasonably accurate fluid velocity measurement.

SUMMARY OF THE INVENTION

These and other problems are generally solved or circumvented, and technical advantages are generally achieved, by preferred embodiments of the present invention that utilize shields between electrode pairs. Generally, shields substantially reduce or prevent circulating currents from contributing an undesired component to the measured voltage, thus helping to ensure that the voltage measurement provides a voltage value that is proportional to the velocity of the fluid flow.

In a preferred embodiment of the present invention, using shields between groups of electrodes generally inhibits or prevents circulating electrical currents from causing a voltage difference that would adversely affect the measured voltage difference between two adjacent electrodes. Generally, once the circulating electrical current flow between the electrode pairs is substantially reduced or eliminated, only the voltage difference from the localized induced electric field remains. This way, a true induced voltage may be measured, and thus an accurate value for the fluid velocity may be determined.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to preferred embodiments in a specific context, namely an apparatus and method for detecting radial water flow through the borehole wall of an oil or gas well. The invention may also be applied, however, to other apparatuses and methods that generally would benefit from the detection of conductive fluid flow in one direction while being insensitive to nonconductive fluid flow in the same direction or to either type of fluid flow in orthogonal directions. For example, the invention may be used to detect conductive fluid flow leaks in some other type of fluid conduit, such as a water pipeline, a chemical line or a sewer line.

As will be described in detail below, a wide variety of shield designs and electrode designs may be used in accordance with preferred embodiments of the present invention. All of these designs, as well as many other variations that one of ordinary skill in the art would understand to be within the scope of the present invention, may be used with the apparatuses and methods disclosed in U.S. patent application Ser. No. 09/880,402, filed Jun. 13, 2001, entitled "Conductive Fluid Logging Sensor and Method," now issued as U.S. Pat. No. 6,711,947 B2, Ser. No. 10/600,053, filed Jun. 20, 2003, entitled "Conductive Fluid Logging Sensor and Method," now issued as U.S. Pat. No. 6,799,407 B2, and Ser. No. 10/924,320, filed Aug. 23, 2004, entitled "Fluid Flow Measuring Device and Method of Manufacturing Thereof," now issued as U.S. Pat. No. 6,971,271. For example, the shield and electrode designs disclosed herein may be used with the devices disclosed in FIGS. 2-10 of the above-mentioned patent applications.

Figure 1:
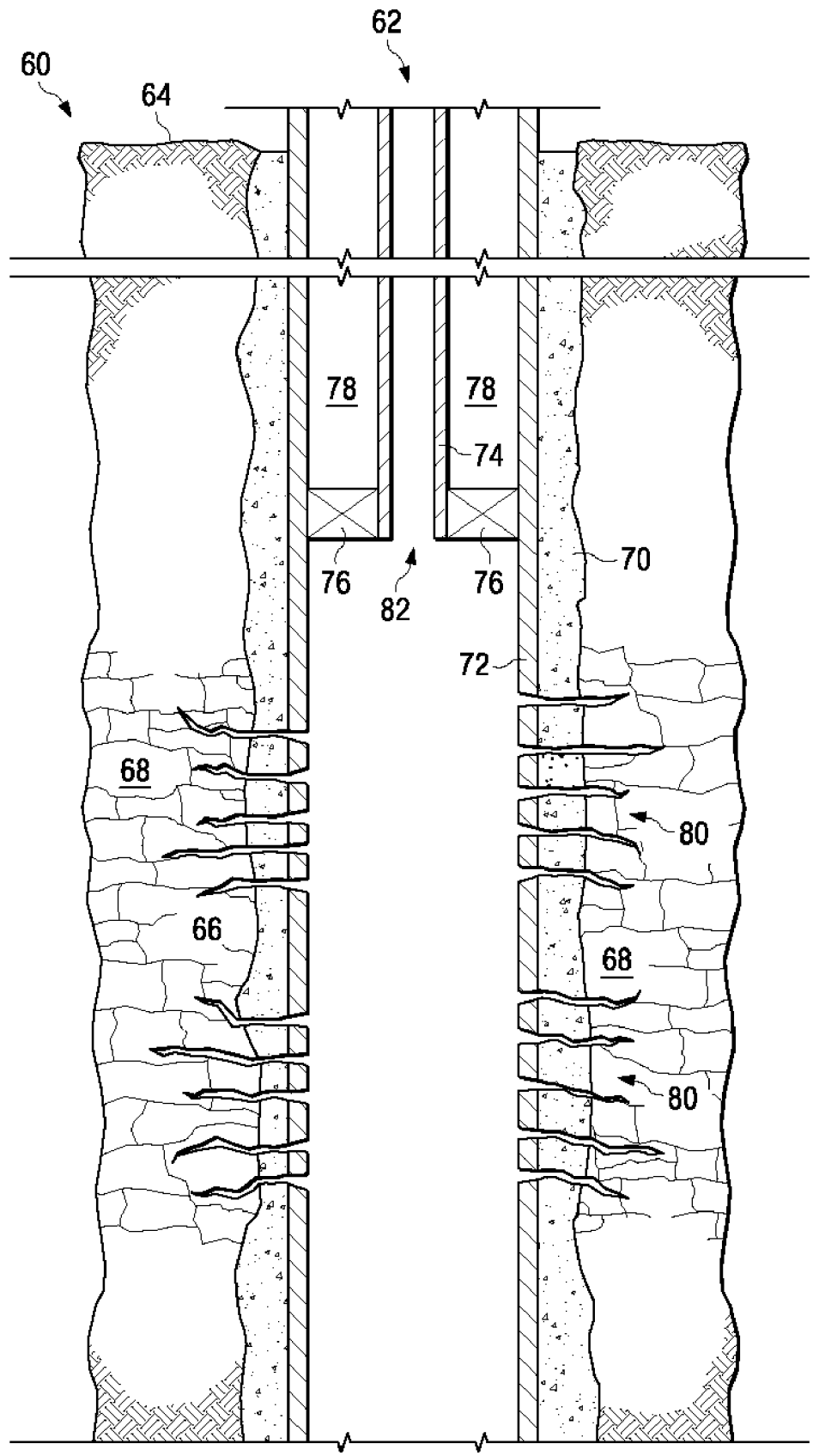
FIG. 1 is a cross-section view of an oil or gas well.
Figure 2A:
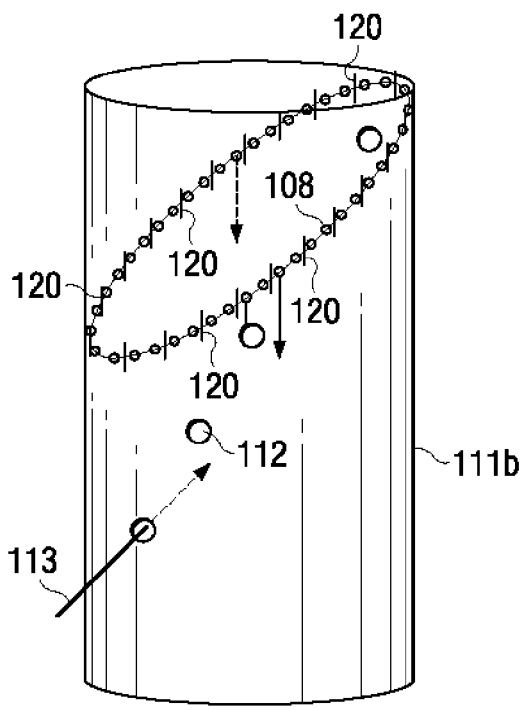
FIG. 2A shows a perspective view of the sensor loop moving towards a water inflow.

FIG. 2A schematically illustrates a perspective view of a sensor loop 108 positioned against the inside of the casing 111b wall as described in U.S. patent application Ser. No.

09/880,402, filed Jun. 13, 2001, entitled "Conductive Fluid Logging Sensor and Method," now issued as U.S. Pat. No. 6,711,947 B2, Ser. No. 10/600,053, filed Jun. 20, 2003, entitled "Conductive Fluid Logging Sensor and Method," now issued as U.S. Pat. No. 6,799,407 B2, and Ser. No. 10/924,320, filed Aug. 23, 2004, entitled "Fluid Flow Measuring Device and Method of Manufacturing Thereof," now issued as U.S. Pat. No. 6,971,271, which are incorporated herein by reference, having shields 120 interposed between adjacent pairs of sensors. Generally, the sensor loop 108 is adapted to move upward and downward over perforation holes 112 through the casing 111b towards an inflow of water 113 through perforation holes 112.

Figure 2B:
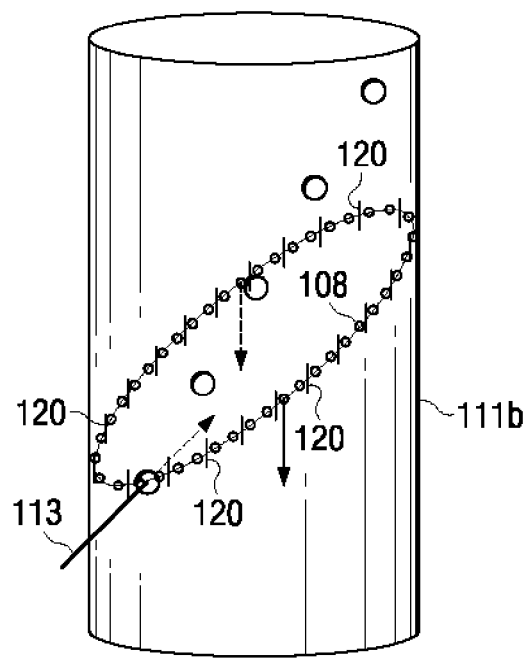
FIG. 2B shows a perspective view of the sensor loop positioned over a water inflow, and thus sensing the water inflow.

In an oil or gas well, water inflow is undesirable, therefore the location of the water inflow is important information to obtain so that the casing 111b can be repaired, for example. No inflow of water is measured in the sensor loop 108 position shown in FIG. 2A, because there is no inflow of water 113 anywhere over the sensor loop 108. Preferably, the sensor loop 108 remains flush with the casing 111b to maintain close proximity to regions of inflow of water 113, in order to directly sense the inflow of water 113. FIG. 2B shows the sensor loop 108 against the inside of the casing wall 111b moving downward and actually at the location of the inflow of water 113 through a perforation hole 112. In this position the sensor loop 108 detects the inflow of water 113.

In accordance with an embodiment of the present invention, one or more shields 120 are positioned between groups of electrodes in a sensor loop, wherein each group of electrodes may have two or more electrodes. (Pairs of electrodes are illustrated herein for illustrative purposes only.) While the shape and size of the shields 120 may vary, it should be noted that at least a portion of each electrode should be exposed to the fluid to allow detection of conductive fluid flow. The position of the electrode with respect to the shield may be adjusted to maximize the detection of conductive fluid flow.

The shields 120 may be formed of a conducting material (e.g., a metal) or an insulating material (e.g., a dielectric). Use of an insulating material, such as a plastic, however, is generally preferable.

The shields 120 may be of any design that adequately prevents or reduces the circulating electrical currents from interfering with measurement of the voltage difference caused by a conductive fluid flow induced electric field. It should be noted, however, that the shields 120 are illustrated in FIGS. 2a and 2b as single planar dividers interposed between pairs of electrodes for illustrative purposes only to illustrate the desired isolation effect between groups of electrodes. Preferably, the shields 120 form a conduit through which the conductive fluid flow passes. The shields 120 may, for example, be tubes having circular, square, rectangular, triangular, elliptical, hexagonal, octagonal, irregular-shaped, a combination of any of the above, or the like cross-section. Generally, any shape shield may be used that allows fluid flow in the desired direction while substantially inhibiting circulating electrical currents from interfering with the electrodes.

Figure 3A:
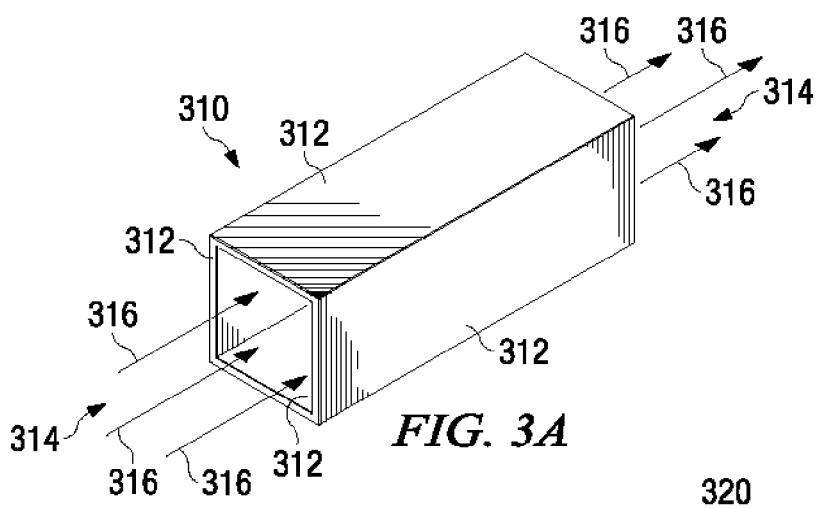
FIG. 3A is a perspective view of a rectangular shield.
Figure 3B:
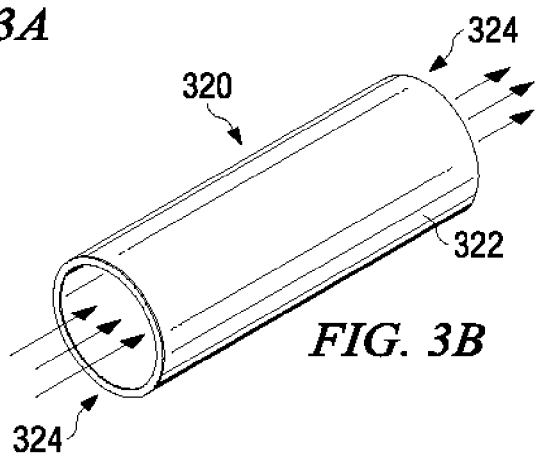
FIG. 3B is a perspective view of a circular shield.

FIGS. 3a and 3b are perspective views of shields having a square cross-section and a circular cross-section, respectively, in accordance with an embodiment of the present invention. Referring first to FIG. 3a, a square shield 310 is illustrated. The square shield 310 preferably has solid surfaces 312 and open ends 314, thereby allowing fluids to flow through the square shield 310 as indicated by directional arrows 316. Similarly, FIG. 3b illustrates a cylindrical shield 320 having a solid side surface 322 and open ends 324. Other shapes may be used.

The shields, such as those illustrated in FIGS. 3a and 3b, are preferably positioned such that the flow of fluid flowing through the shields is substantially parallel to the flow of conductive fluid that is to be detected. In the embodiment of the borehole discussed above, the shields are preferably positioned such that the flow of fluid through the shields is substantially orthogonal to the longitudinal axis of the borehole or conduit in order to detect the radial flow of conductive fluid through the wall of the borehole or conduit. In this manner, the interference from the induced electric field due to the flow of conductive fluid is limited and limits the interference to adjacent sensors.

Figure 4:
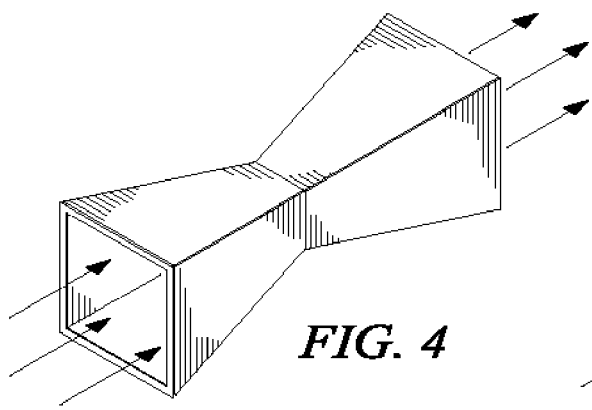
FIG. 4 is a perspective view of a rectangular shield having a mid-section narrower than the ends.
Figure 5:
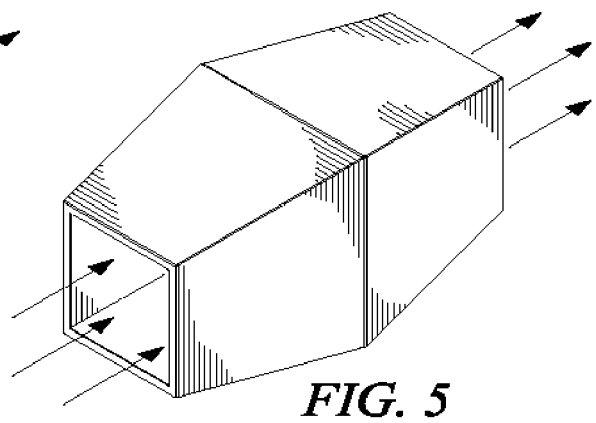
FIG. 5 is a perspective view of a rectangular shield having a mid-section wider than the ends.
Figure 6:
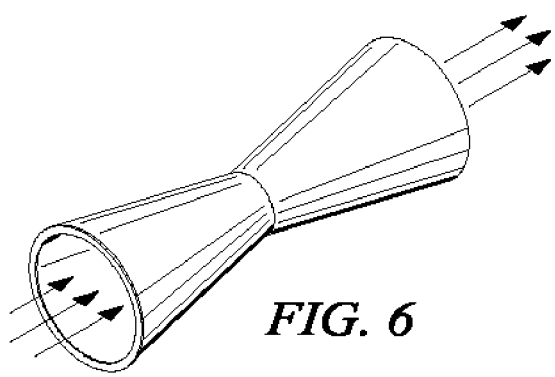
FIG. 6 is a perspective view of a circular shield having a mid-section narrower than the ends.
Figure 7:
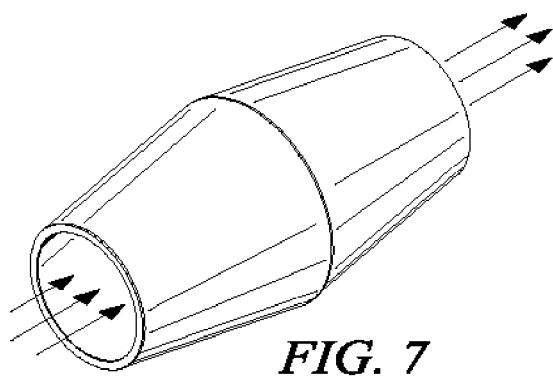
FIG. 7 is a perspective view of a circular shield having a mid-section wider than the ends.

Additional variations in the shield design are possible, with the primary object being to block the circulating electrical currents from the electrodes. Some of these designs may help increase the mechanical strength of the measurement sensor loop or improve the manufacturability or other aspects of preferred embodiments of the invention. For example, one variation is a conduit having varying inner dimensions along the direction of fluid flow through the shield. The shields may have a rectangular cross-section such that the perimeter is reduced in a mid-region along the direction of the fluid flow as illustrated in FIG. 4, a rectangular cross-section such that the perimeter is enlarged in a mid-region along the direction of the fluid flow as illustrated in FIG. 5, a circular cross-section such that the circumference is reduced in a mid-region along the direction of fluid flow as illustrated in FIG. 6, or a circular cross-section such that the circumference is enlarged in a mid-region along the direction of fluid flow as illustrated in FIG. 7. Similar shields may be used having different cross-section shapes, such as circular, square, triangular, elliptical, hexagonal, octagonal, irregular in shape, a combination of any of the above, or the like cross-section.

Figure 8:
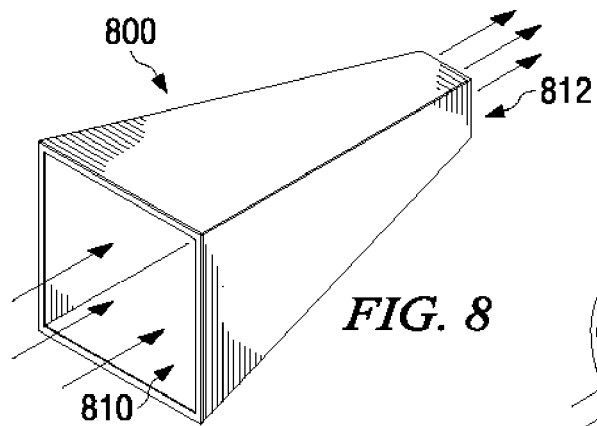
FIG. 8 is a perspective view of a rectangular shield having a tapered perimeter.
Figure 9:
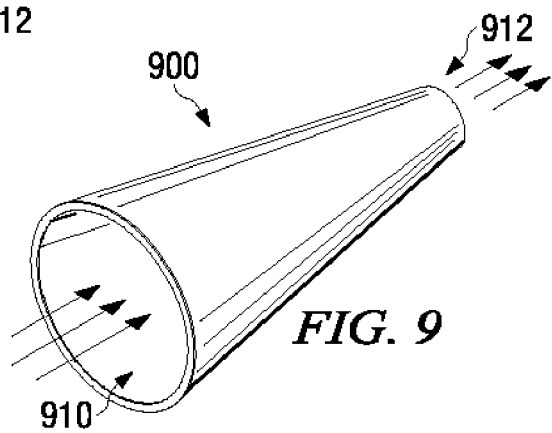
FIG. 9 is a perspective view of a circular shield having a tapered circumference.

It should be noted that FIGS. 4-7 illustrate embodiments in which the cross-section of the ends (the entry and exit points of the fluid) are congruent for illustrative purposes only, and that the cross-section of the ends of a shield may be of different sizes. For example, shields may be used that have a tapered, increasing or decreasing, shape along the fluid flow. For example, FIG. 8 illustrates a rectangular-tapered shield 800 having a rectangular cross-section such that the perimeter of a receiving end 810 is greater than the perimeter of an exiting end 812, and FIG. 9 illustrates a circular-tapered shield 900 having a circular cross-section such that the circumference of a receiving end 910 is greater than the perimeter of an exiting end 912. It should be noted that the receiving ends 810 and 910 are illustrated as being larger than the exiting ends 812 and 912, respectively, for illustrative purposes only. Other embodiments of the present invention may orient the shields such that the expected fluid flow enters the narrower end (e.g., ends 812 and 912) and exits the larger end (e.g., ends 810 and 910). Furthermore, the thickness of the floor, sides and roof of each shield may be different from each other.

Figure 10:
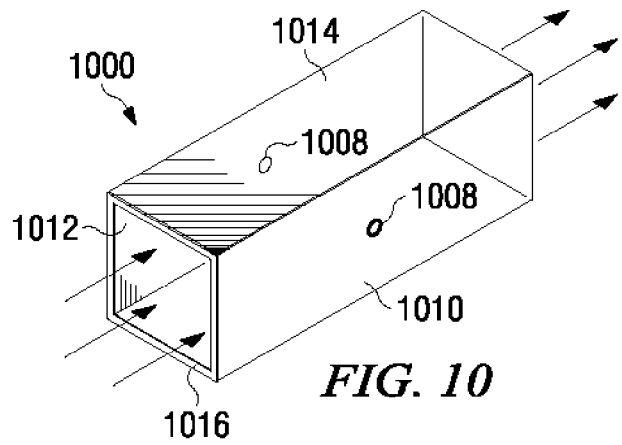
FIG. 10 is a perspective view of a rectangular shield having point electrodes.

FIG. 10 illustrates a rectangular shield 1000 having point electrodes 1008 in accordance with an embodiment of the present invention. It should be noted that the rectangular shield 1000 is illustrated as having transparent sides for illustrative purposes to better illustrate the placement of the point electrodes 1008. As illustrated in FIG. 10, the point electrodes are located along the inner side of opposing sidewalls 1010 and 1012. The point electrodes may be placed along the sidewalls 1010 and 1012, as illustrated in FIG. 10, or along the top wall 1014 and the bottom wall 1016. Additionally, the point electrodes 1008 may be positioned in the middle of the shield, or closer to either end. However, it is preferred that the point electrodes be arranged such that a line drawn connecting the point electrodes 1008 is orthogonal to the conductive fluid flow. It should be noted that the sensors (not shown) are preferably mounted along opposing interior walls of the shields as described below.

Figure 11:
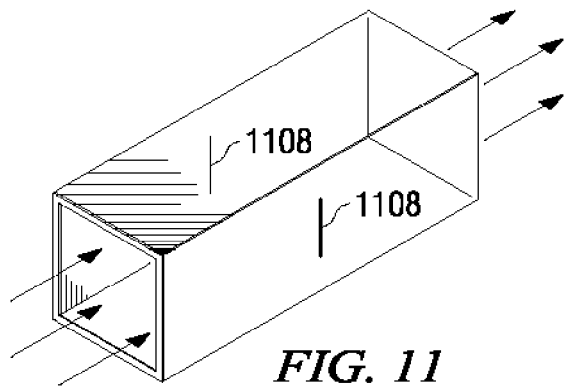
FIG. 11 is a perspective view of a rectangular shield having medium-sized electrodes.
Figure 12:
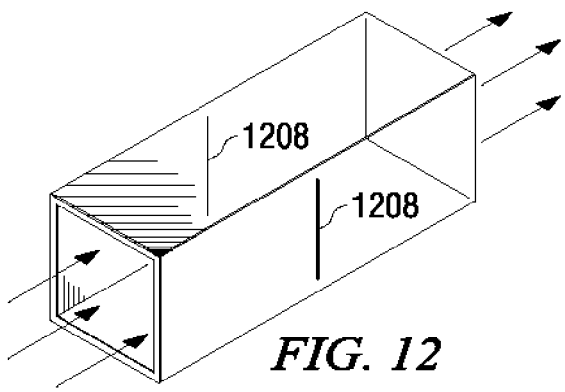
FIG. 12 is a perspective view of a rectangular shield having large-sized electrodes.

As other examples, FIGS. 11 and 12 illustrate medium-sized electrodes 1108 and large-sized electrodes 1208, respectively, in accordance with an embodiment of the present invention. In these embodiments, the point electrodes 1008 of FIG. 10 are replaced with longitudinal electrodes, such as the medium-sized electrodes 1108 of FIG. 11 and the large-sized electrodes 1208 of FIG. 12. The position of the medium-sized electrodes 1108 and the large-sized electrodes 1208 may be varied (e.g., closer to either end of the conduit), but it is preferred that the medium-sized electrodes 1108 and the large-sized electrodes 1208 be arranged such that a line drawn connecting the electrodes is orthogonal to the conductive fluid flow.

Figure 13:
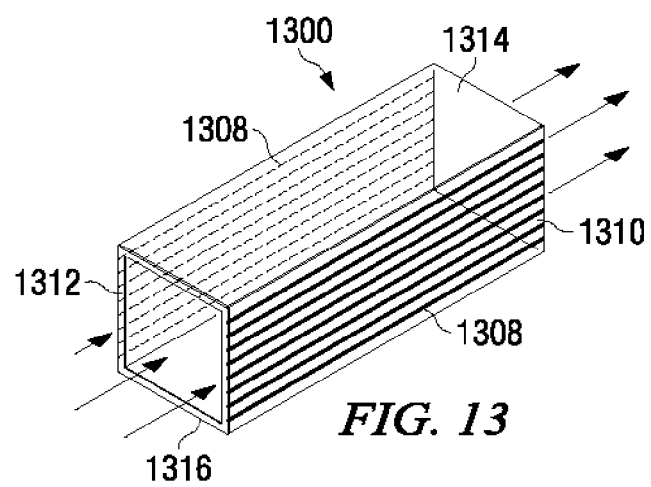
FIG. 13 is a perspective view of a rectangular shield wherein electrodes are mounted on opposing sides of the rectangular shield.

FIG. 13 illustrates an example of large area electrodes that may be used in accordance with the present invention. In particular, FIG. 13 illustrates an example in which the electrodes cover a larger area, such as the sides of shield 1300. In the embodiment illustrated in FIG. 13, electrodes 1308 substantially cover opposing sides 1310 and 1312 of the shield 1300. In this embodiment, it is preferred that the top 1314 and the bottom 1316 be formed of a dielectric or insulating material. This type of electrode may have the advantage of the measured voltage difference being independent of the fluid velocity distribution within the given shield, although this may not be a problem with a smaller shield. A circular shield with point electrodes at the ends of the appropriate diameter provides a measured voltage that should indicate an accurate fluid velocity regardless of whether any currents are circulating within the shield, as long as the fluid flow is axially symmetric within the circular tube or column (again, currents circulating within a small shield generally should not be a problem in practice).

Alternatively, the electrodes may take on other shapes (e.g., curved, spiral, etc.) and other orientations (e.g., horizontal, diagonal, etc.), or combinations of the above. Preferably, each electrode is exposed to fluid flow on each side of the sidewall to which it is mounted. Alternatively, separate electrodes may be mounted on each side of a given sidewall.

For various reasons, empirical calibration of the fluid flow velocity preferably may be used, and may even be necessary.

It should be noted that some variation in the nominally regular spacing of the electrodes could be used to give greater mechanical strength to the sensor loop. Also, some occasional variations in the overall thickness of the sensor loop shields may be used to enhance mechanical strength while maintaining a small overall size for running into and out of a well. Other means may be used for strengthening the sensor loop, such as a strong flexible insert above or below the shields, or a strong top layer on top of the shields. Other possible ways to mechanically strengthen the sensor loop are possible and are considered to be within the spirit and scope of the present invention.

Figure 14:
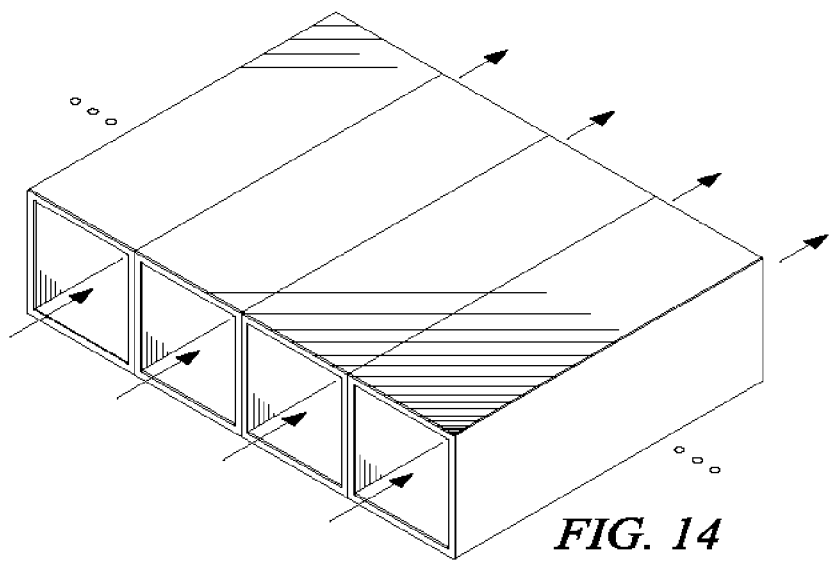
FIG. 14 is a perspective view of multiple rectangular shields.
Figure 15:
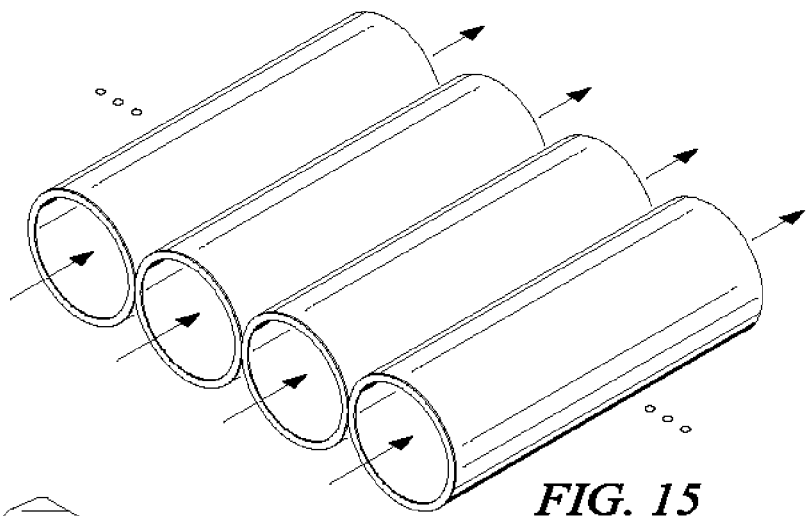
FIG. 15 is a perspective view of multiple circular shields.
Figure 16:
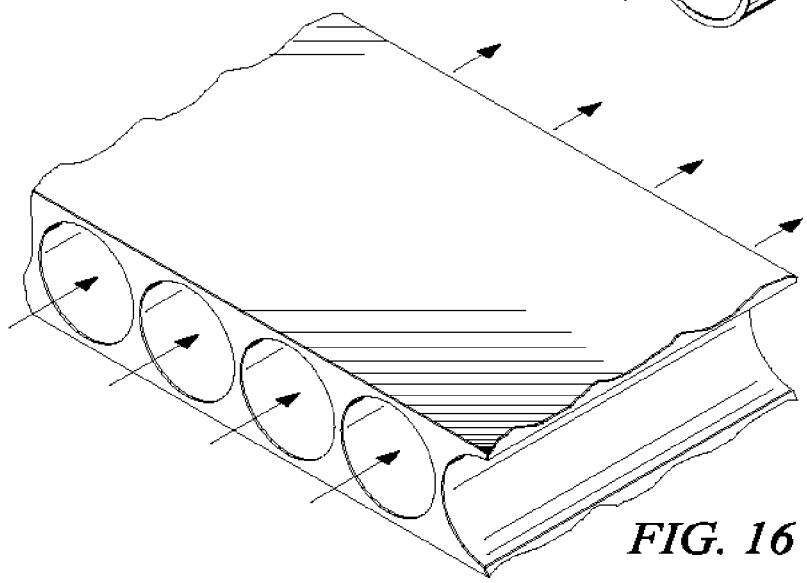
FIG. 16 is a perspective view of multiple circular shields wherein the space between the circular shields is filled.

FIGS. 14-16 illustrate embodiments of the present invention in which multiple shields are used with multiple electrodes. In particular, FIG. 14 illustrates the use of multiple rectangular shields to isolate adjacent groups (two or more) electrodes (not shown), and FIG. 15 illustrates the use of multiple circular shields to isolate adjacent groups of electrodes (not shown). FIG. 16 is similar to FIG. 15, except that the space between the circular shields is filled with a dielectric or insulating material. This embodiment may have the added advantage of providing additional shielding and providing additional mechanical support for the sensor ring.

These configurations may be used on a sensor loop as disclosed in the previously mentioned patent applications, such as patent application Ser. No. 09/880,402, now U.S. Pat. No. 6,711,947. In particular, the configuration of FIG. 11 of the present disclosure may be used on radial sensing device 108 in FIGS. 2-4, 5D and 6 of patent application Ser. No. 09/880,402, now U.S. Pat. No. 6,711,947. Furthermore, the configuration of FIG. 11 of the present disclosure may be used for electrodes 129 in FIGS. 8-9 and 10A-10B of patent application Ser. No. 09/880,402, now U.S. Pat. No. 6,711,947. Again, both the shields and the electrodes may be any of a wide variety of designs, some of which have been discussed above.

Although the present invention and its advantages have been described in detail, it should be understood that various changes, substitutions and alterations can be made herein without departing from the spirit and scope of the invention as defined by the appended claims. For example, different shield designs may be used within a single sensor loop, or different electrode designs may be used within a single sensor loop.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fluid flow measuring device, comprising:
    a plurality of resistors;
    a plurality of shields disposed along a body of the fluid flow measuring device;
    a plurality of electrodes, each electrode coupled between two adjacent resistors and disposed proximate an interior surface wall of one of the shields;
    a first coil of wire adapted to generate a magnetic field wound proximate the electrodes;
    a second coil of wire adapted to generate a magnetic field wound proximate the electrodes; and
    a voltage measuring mechanism electrically coupled between two of the resistors.

2. The fluid flow measuring device of claim 1, wherein the shields are interconnected.

3. The fluid flow measuring device of claim 1, wherein the shields comprise a conduit through which fluid may flow.

4. The fluid flow measuring device of claim 1, wherein the electrodes comprise a point electrode.

5. The fluid flow measuring device of claim 1, wherein the electrodes comprise a longitudinal electrode.

6. The fluid flow measuring device of claim 1, wherein the electrodes substantially cover opposing sides of the shields.

7. A fluid flow measuring device, comprising:
    a plurality of shields disposed along a body of the fluid flow measuring device;
    a series-coupled plurality of alternating electrodes and resistors, wherein each of the electrodes is disposed proximate an interior surface wall of one of the shields;
    a magnetic field source, the magnetic field source oriented to generate a magnetic field between adjacent electrodes, the magnetic field substantially orthogonal to an imaginary line intersecting the adjacent electrodes; and a voltage measuring circuit electrically coupled to the plurality of alternating electrodes and resistors, the voltage measuring circuit coupled to measure a voltage difference between the adjacent electrodes, the voltage difference representative of a radial flow of conductive fluid substantially orthogonal to both the imaginary line and the magnetic field.

8. The fluid flow measuring device of claim 7, wherein the shields are interconnected.

9. The fluid flow measuring device of claim 7, wherein the shields comprise a conduit through which fluid may flow.

10. The fluid flow measuring device of claim 7, wherein the electrodes comprise a point electrode.

11. The fluid flow measuring device of claim 7, wherein the electrodes comprise a longitudinal electrode.

12. The fluid flow measuring device of claim 7, wherein the electrodes substantially cover opposing sides of the shields.

13. A fluid flow measuring device, comprising:
a plurality of resistors;
a plurality of electrodes, at least one resistor being coupled between two adjacent electrodes;
a plurality of shields each having two or more of the electrodes disposed therein;
a pair of coils adapted to generate a magnetic field proximate the electrodes, the pair of coils being substantially parallel to each other; and
a voltage measuring mechanism electrically coupled between two of the resistors.

14. The fluid flow measuring device according to claim 13, wherein the magnetic field is an alternating magnetic field.

15. The fluid flow measuring device according to claim 13, wherein the pair of coils are electrically coupled to an alternating current source.

16. The fluid flow measuring device according to claim 13, wherein the coils comprise copper.

17. The fluid flow measuring device according to claim 13, wherein the plurality of resistors comprise values of between about 500,000 ohms and about 2,500,000 ohms.

18. The fluid flow measuring device according to claim 13, wherein at least the resistors and electrodes are mounted on a sensor loop, the sensor loop being spring-loaded to maintain the sensor loop near an interior wall of a fluid conduit.

19. The fluid flow measuring device according to claim 13, further comprising a ferromagnetic material disposed between the two coils.

20. The fluid flow measuring device according to claim 19, wherein the ferromagnetic material comprises an iron alloy.

21. The fluid flow measuring device according to claim 13, wherein at least the resistors and electrodes are mounted on a sensor loop, the sensor loop being spring-loaded and being adapted to exert outward pressure to maintain the sensor loop near a casing interior wall.

22. The fluid flow measuring device according to claim 21, further comprising:
means for maintaining the sensor loop near the casing interior wall over a range of casing diameters.

23. The fluid flow measuring device according to claim 21, wherein the sensor loop comprises a body comprising fluoropolymer resin.

24. The fluid flow measuring device according to claim 21, wherein the sensor loop is spring-loaded with a stainless steel spring wire.

25. The fluid flow measuring device according to claim 21, wherein the sensor loop has a substantially oval shape.

26. A fluid flow measuring device, comprising:
a series-coupled plurality of electrodes and resistors wherein one or more resistors are coupled between adjacent electrodes;
a plurality of shields each having two or more of the electrodes disposed therein;
a magnetic field source, the magnetic field source oriented to generate a magnetic field between adjacent electrodes, the magnetic field substantially orthogonal to an imaginary line intersecting adjacent electrodes; and
a voltage measuring circuit electrically coupled to the plurality of electrodes and resistors, the voltage measuring circuit coupled to measure a voltage difference between the adjacent electrodes, the voltage difference representative of a flow of conductive fluid through the magnetic field.

27. The fluid flow measuring device according to claim 26, wherein the magnetic field is an alternating magnetic field.

28. The fluid flow measuring device according to claim 26, wherein the electrodes are disposed along a curved loop.

29. The fluid flow measuring device according to claim 26, wherein the magnetic field source includes an alternating current source.

30. The fluid flow measuring device according to claim 26, wherein the voltage difference is proportional to a velocity of the radial flow of conductive fluid.

31. The fluid flow measuring device according to claim 26, wherein the adjacent electrodes are spaced about 0.3 inches or less from each other.

32. The fluid flow measuring device according to claim 26, wherein the electrodes are mounted on a sensor loop, the sensor loop comprising a force loop exerting outwardly directed radial force.

33. The fluid flow measuring device according to claim 26, wherein the resistors comprise values of between about 500,000 ohms and about 2,500,000 ohms.

34. The fluid flow measuring device according to claim 26, wherein the magnetic field source comprises a first coil of wire proximate the electrodes.

35. The fluid flow measuring device according to claim 34, wherein the magnetic field source further comprises a second coil of wire proximate the electrodes and offset from the first coil of wire.

36. The fluid flow measuring device according to claim 35, wherein the magnetic field source further comprises a ferromagnetic material disposed between the first coil of wire and the second coil of wire.

* * * * *